(12) United States Patent
Graefe et al.

(10) Patent No.: US 6,298,342 B1
(45) Date of Patent: Oct. 2, 2001

(54) ELECTRONIC DATABASE OPERATIONS FOR PERSPECTIVE TRANSFORMATIONS ON RELATIONAL TABLES USING PIVOT AND UNPIVOT COLUMNS

(75) Inventors: Goetz Graefe, Bellevue; Jeff Alger, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/039,728

(22) Filed: Mar. 16, 1998

(51) Int. Cl.$^7$ ..................................... G06F 17/30

(52) U.S. Cl. .................................. 707/4; 707/7; 707/101

(58) Field of Search ................................. 707/4, 10, 101, 707/104, 7, 2, 202

(56) References Cited

U.S. PATENT DOCUMENTS

| | | | |
|---|---|---|---|
| 4,819,156 | 4/1989 | DeLorme et al. | 364/200 |
| 5,317,686 | * 5/1994 | Salas et al. | 707/503 |
| 5,350,925 | * 9/1994 | Watson | 250/269.3 |
| 5,418,898 | * 5/1995 | Zand et al. | 395/137 |
| 5,504,885 | * 4/1996 | Alashqur | 395/705 |
| 5,604,854 | * 2/1997 | Glassey | 707/503 |
| 5,765,153 | * 6/1998 | Benantar et al. | 707/9 |
| 5,818,726 | * 10/1998 | Lee | 364/489 |
| 5,913,217 | * 6/1999 | Alger et al. | 707/101 |
| 5,933,830 | * 8/1999 | Williams | 707/100 |
| 6,014,670 | * 1/2000 | Zamanian et al. | 707/101 |
| 6,044,366 | * 3/2000 | Graffe et al. | 707/2 |
| 6,122,644 | * 9/2000 | Graffe et al. | 707/202 |

FOREIGN PATENT DOCUMENTS

95/11487   10/1993   (WO) .............................. G06F/17/00

OTHER PUBLICATIONS

Desmarais, B., "Using Microsoft Excel Pivot Table For Reliability Applicants," Reliability Symposium, IEEE, 1996, pp. 79–91.*

Gray et al., "Data Cube: A Relational Aggregation Operator Generalizing Group–by, Cross–Tab, and Sub–Totals," Microsoft Technical Report, MSR–TR–95–22, p. 1–10, Oct. 18, 1995.*

SQLPro Agent Gets Update—Eases Data Querying and Input Process InformationWeek, Sep. 30, 1996, pp. 98.*

Feibus, Andy, "Plain–English Database Tools—English Wizard and VB ELF Let You Make Database Queries Without Using SQL," InformationWeek, Nov. 17, 1997, pp. 150.*

"The OLAP Council: 'OLAP and OLAP Server Definitions' (@ The OLAP Council 1995) accessible on–line at: http://www.datamation/com/dataw/p4bevalgls.html;", 10 pgs, (1995).

Darling, C.B., "Think Outside the OLAP Box", *Datamation USA*, vol. 42, No. 8, 88–92, (Apr. 15, 1996).

(List continued on next page.)

*Primary Examiner*—Thomas Black
*Assistant Examiner*—Charles L. Rones
(74) *Attorney, Agent, or Firm*—Woodcock Washburn Kurtz Mackiewicz & Norris

(57) ABSTRACT

A "pivot" operation rotates the data items in a relational database table so that certain data values in the table become column names of the pivoted table, and the data items of a specified value column appear in corresponding rows in the new columns of the pivoted table. A pivot list specifies that only certain values of the pivot column data items participate in the operation. Additional columns of the input table appear as columns in the output table; the rows of the output table are grouped by equal data-item values in these grouping columns. An "unpivot" operation provides the inverse of the pivot operation. Both operations may be nested in an SQL user query at the algebraic level. The operations occur in the search engine of a relational database management system, and may also be invoked as part of an optimization of another query.

18 Claims, 4 Drawing Sheets

OTHER PUBLICATIONS

Desmarais, B., "Using the Microsoft Excel Pivot Table for Reliability Applications", IEEE 34th Annual Spring REliability Symposium USA, 18, 79–81, (Apr. 1996).

Flohr, U., "Olap by Web", *Byte, USA,* XP 726368, 81–84, (Sep. 1997).

Frank, M., "BrioQuery 3.5", *DBMS Online USA* (http://www.dbmsmag.com/9602d10.html), 4 pgs., (Feb. 1996).

Gyssens, M., et al., "Tables as a Paradigm for Querying and Restructuring", *Proceedings 1996 ACM Sigmond Intl. Conf. on management of Data,* Montreal, CA, 93–103, (Jun. 3–6, 1996).

Lindholm, E., et al., "Datamation's Feature Summary: OLAP Servers", *Datamation USA*, vol. 41, No. 8, 70–71, (May 1995).

Nossiter, J.C., "Using Excel 5 for Windows", Que Corp. USA, MP002109365, (1995).

Graefe, G., "Query Evaluation Techniques for Large Databases", *ACM Computing Surveys,* 25(2), 73–170, (Jun. 1993).

Nossiter, J.C., "Using Excel as a Database—Databases as a Nutshell", Que Corp., XP–002109365, pp. 255–281, (1995).

\* cited by examiner

ELECTRONIC DATABASE OPERATIONS FOR PERSPECTIVE TRANSFORMATIONS ON RELATIONAL TABLES USING PIVOT AND UNPIVOT COLUMNS

BACKGROUND OF THE INVENTION

The present invention relates to electronic data processing, and more specifically concerns new query operations for the manipulation of tables in relational databases and similar types of data-management software.

A database is a collection of data in an organized structure. A typical database is stored in a computer as a set of records each having a number of fields for holding data items of a particular kind, such as character strings, numbers, or pointers to data located somewhere else. A relational database comprises any number of rectangular tables. Each table has a set of records; each record is referred to as a row of its table. Each record in the same table has the same number of fields. (However, some fields in a record may hold no data, indicated by a NULL value.) The fields of a table form a set of columns, which may have designated names that are not part of the data itself. The records do not have external to identify them individually. Instead, they are accessed by a key consisting of the contents of some combination of the fields; that is, a relational database may be considered to be a software-implemented content-addressable memory.

A database management system (DBMS, or database system) is computer software for storing, maintaining, and searching the data in a database. A DBMS usually includes facilities for increasing performance, reliability, and integrity, such as indexes, logging, and record locking. It always includes one or more interfaces for finding particular data from the database and for presenting these queries to a search engine. The engine searches the database and returns to the user a result, usually in the form of a relational table, which matches the specifications of the query.

The most widespread interface for relational databases is Structured Query Language (SQL). Although many variants of this interface language exist, standard versions have been defined by the American National Standards Institute (ANSI) and the International Standards Organization (ISO). Most present commercial realizations of SQL follow these standard versions, although many of them include language constructs in addition to those defined in the standard, or at different levels of compliance.

Relational databases and relational query languages treat data as a set of rectangular tables. Yet many databases are conceptually multidimensional, based upon axes such as time {day, month, year}, locale {store, city, state}, category {product, product_group}, actor {clerk, department, division}, payment {cash, check, credit}, and so forth. A user often finds it useful to think of such data as a collection of collections, and may wish to view them from different perspectives. In the above example, one perspective is a collection of records, where each record represents a locale, and contains a collection of monthly sales data for that locale; another perspective sees a collection of records (i.e., rows of a table) where each denotes a particular point in time, and the fields of each record (i.e., the columns of the table) collect sales figures for the different categories.

From this point of view, the ability to transform a database table from one perspective to another—to rotate the dimensions of the data—would be a valuable addition to the conventional capabilities of a query language such as SQL. In this context, to rotate perspectives or dimensions means to interchange a dimension represented in a table as a set of columns with a dimension represented as a set of rows. Conventional relational DBMS products and standards offer no direct operation for rotating perspectives. Although it is possible to formulate SQL queries to achieve this effect indirectly, such queries are large, complex, error-prone, slow, and hard to optimize into efficient execution plans, even when parallel processing is available.

Some conventional spreadsheet software allows a user to interchange data in a user-selected rectangle of cells to be interchanged in the same way that a matrix-algebra "transpose" operation relocates a matrix element $a_{ij}$ to $a_{ji}$. In the Pivot Table feature of the Excel® spreadsheet from Microsoft Corp., for example, a user selects a rectangle of cells, copies it into a temporary clipboard, points to a destination cell, and performs a "paste special" operation after selecting "transpose" from an options menu. With a suite of compatible application programs such as the Microsoft Office® suite of office programs from Microsoft Corp., a user may even select data from a database table in the Microsoft Access® database component of Microsoft Office, transfer it as a single object to the Excel component as a rectangle of spreadsheet cells, transpose the cells, then transfer the cells back into the Access database as a collection of records in the transposed format.

Transposing data items in this manner is both clumsy and functionally limited. Even for small databases, the invocation of another application program merely to carry out a single query is wasteful. For large databases, the conventional requirement that transposed data reside in memory renders this method impossible. For client/server architectures using host-based search engines, there is no way to connect to a spreadsheet program for performing the operation. In any environment, transposition via spreadsheet requires manual intervention, and thus does not permit a transposition to form an internal part of a query within a database program. Such external operations cannot participate in the sophisticated reformulation, rewriting, and other optimization procedures of conventional database-query processors and other search engines. On a more conceptual level, fundamental differences between spreadsheets and relational database tables prohibit the desired types of transposition. For example, the names of the columns or fields in a database table are not a part of the table itself; they do not form a record of the table in the way that column headings in a spreadsheet are a row of cells within the spreadsheet. Transposing a rectangle of cells in a spreadsheet thus cannot transform a column of cells into the names of columns when the spreadsheet rows return to the database program as records in a table.

In the Microsoft SQL Server® database management system from Microsoft Corp., the execution engine has a strictly internal operation for splitting each item of a table update having the form (row_identifier, old_values, new_values) within a stream of update items into a "delete item" and an "insert item" which interchanges certain row and column values, and a similar operation for collapsing a "delete item" and an "insert item" into an "update item". These operations are not available to users and cannot participate in user queries. That is, the query processor uses them internally only for facilitating the efficient execution of certain functions performed while updating databases.

Thus, the database art could be significantly expanded by providing a facility for fast, efficient rotation of perspectives, especially for relational databases. Moreover, there is a need for rotation or transposition operations whose semantics and syntax integrate well into query languages such as SQL as natural extensions, and which can be optimized and executed in conventionally organized database query processors and other search engines without adding complex or idiosyncratic facilities.

SUMMARY OF THE INVENTION

The present invention provides a "pivot" operation for transforming the rows (records) and columns (fields) of a table, as that term is defined in a relational database, so as to provide different perspectives into the data items in the table. The operation accepts an input table and a pivot specification, and produces an output table. It takes place in the interface-language organization in such a way that it can be easily integrated into conventional database query processors, search engines, and servers. The operation places data in the fields of specified table records into the same field of different records, using the values of one or more designated table column as the names of the fields themselves. Data in any further columns are grouped by data values in a pivoted table.

It is sometimes easier to perform other relational operations upon a database table from another perspective, even when the ultimate result will have the original perspective. Therefore, the invention also provides an "unpivot" operation as an inverse to the pivot facility. Also, sometimes it is desirable to unpivot a stored table or intermediate result.

These operations, along with a simple and intuitive way of incorporating them into database queries, simplifies the writing of queries and makes them less error-prone. For example, they reduce or eliminate the need for joining tables to themselves. The method of invoking the operations permits deep nesting of multiple operations with a simple and powerful syntax extension and well-defined semantics, and applies a familiar programming-language paradigm. Permitting text as method arguments in queries enhances the power and ease of use of the extended SQL language. Moreover, expanding the set of relational-algebra expressions available in this manner to nonprocedural query expressions may also be applied to other operations, such as sample, top, and rank.

Pivot and unpivot operations according to the invention are inherently compatible with many types of data-manipulation software, and system architectures, especially including relational databases. These operations can be integrated into such systems both at the language level (e.g., by means of intuitive extensions to SQL and other query languages) and at the processing level (e.g., query optimization and execution).

Integrating data from multiple databases into a single data-warehouse database frequently faces an "impedance mismatch" when the multiple data sources have mutually differing shapes or row/column ratios. Almost by definition, such databases can be extremely large. Normalizing such data may depend upon context: storing data in pivoted form or perspective may be optimal—or even necessary—for one schema, while another schema may prefer or require the unpivoted form. Therefore, adding pivot and unpivot operations can greatly benefit the combination of data from different sources, especially large amounts of data.

The new operations provided by the invention also expedite lower-level DBMS processing, even with limited system resources. The extensible syntax and clear semantics of the new operations facilitates automatic generation and optimization of complex queries, especially in the rewriting of queries for more efficient execution. Even purely internal DBMS functions, such as update processing for index and integrity maintenance and other purposes, can benefit. The processing of SQL queries involving IN, OR, and UNION queries can be enhanced. Many optimization techniques already employed for GROUP BY queries are routinely adaptable to processing pivot and unpivot queries. Conventional execution algorithms including parallel-processing techniques for these queries apply to pivoting tables or query results, including unsorted and partitioned tables and results.

Other features and advantages of the invention, as well as variations within the scope of the invention, will appear to those skilled in the art from the following detailed description.

DETAILED DESCRIPTION

Exemplary Operating Environment

Figure 1:
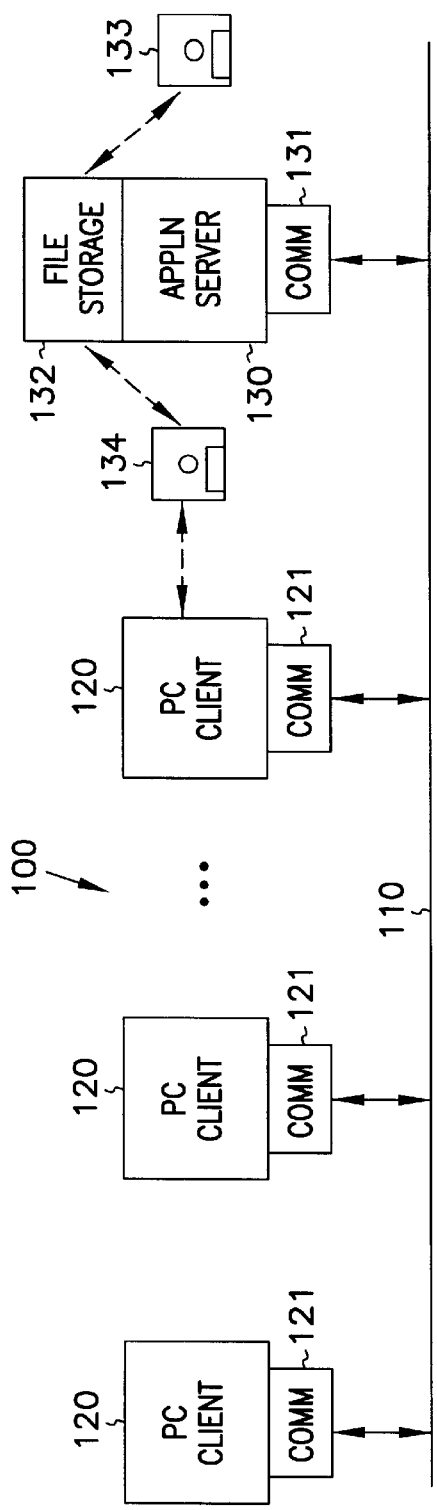
FIG. 1 is a block diagram of a computer network environment for the invention.

Datanase management systems are implemented in many different types of data-processing systems, including standalone personal computers, midrange and mainframe computers, peer-to-peer and client/server networks, and wide-area distributed systems of many architectures. All data-processing systems are suitable environments for the present invention. For purposes of exposition, however, the invention will be described in connection with a conventional client/server computer system 100, shown in FIG. 1. Network wiring 110 interconnects a number of personal computers (PCs) 120 to a server 130 via network adapters 121 and 131. Server 130 includes a storage subsystem 132 for holding the large amounts of data in typical enterprise databases. Other system architectures are also suitable environments for the invention; for example, units 120 may be terminals connected to a mainframe or midrange computer 130, or unit 130 may itself comprise a PC coupled to PCs 120 in a peer-to-peer network. For small and modest databases, the entire system 100 may comprise a single PC acting as both client and server. Likewise, file storage may be distributed among a number of different machines. FIG. 1 shows schematic representations of an external storage medium 133 which may store client and server software for distribution and downloading to clients, and another medium 134, such as a diskette, for offline storage of database tables.

FIG. 1A and the following discussion are intended to provide a brief, general description of a personal computer 120. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computes, and the like. The invention may also be practiced in distributed computing environments where tasks are performed by remote processing devices that are linked through a communications network. In a distributed computing environment, program modules may be located in both local and remote memory storage devices.

Figure 2:
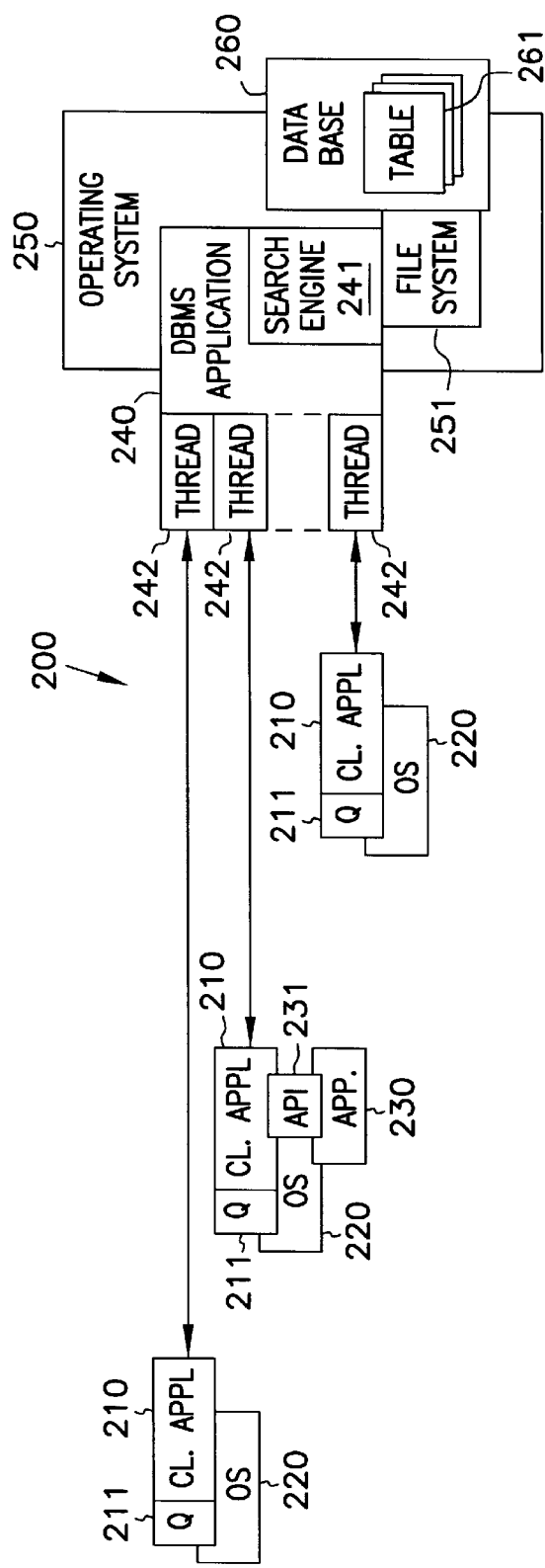
FIG. 2 is a diagram of a database management system for hosting the invention.

FIG. 2 is a block diagram of a typical conventional client/server database management system 200 capable of operating in system 100, FIG. 2. A client application program 210 executes within each PC 120, under a PC operating system 220 such as the Windows 95® operating system from Microsoft Corp. Among other functions, client application 210 contains a facility 211 for accepting database queries from a user at a PC 120. In addition to user entries, other application programs 230 executing in some of the PCs 120 may present queries to DBMS client 210, via predefined host-language application-program interfaces (APIs) 231.

Within server 130, a DBMS server application 240, such as Microsoft SQL Server, executes under a server operating system 250 such as the Windows NT® operating system from Microsoft Corp. DBMS program 240 provides services for creating, querying, maintaining, and modifying a number of relational databases, exemplified by database 260. Program 240 may employ the file-system services 251 of operating system 250, or may provide its own file system. Operating system 250 could execute a separate instance of the entire DBMS application for each request from a client 210. For greater efficiency, however, program 240 gives each client connection a separate thread 242 in the DBMS kernel. Further, this thread may be a native operating-system thread, which carries with it all the Windows NT mechanisms for process memory protection, better access to storage devices, and so forth. Search engine 241 processes queries and other requests from individual clients 210 upon tables 261 of a database 260, as described more fully below. It also enforces database integrity with conventional facilities for record locking, atomic transactions, etc. In Microsoft SQL Server, the interface language between query facility 211 and search engine 241 is Transact-SQL, which provides most of the functions of the standard ANSI SQL 89 and ANSI SQL 92 languages, plus extensions for providing greater flexibility and programmability.

Figure 3:
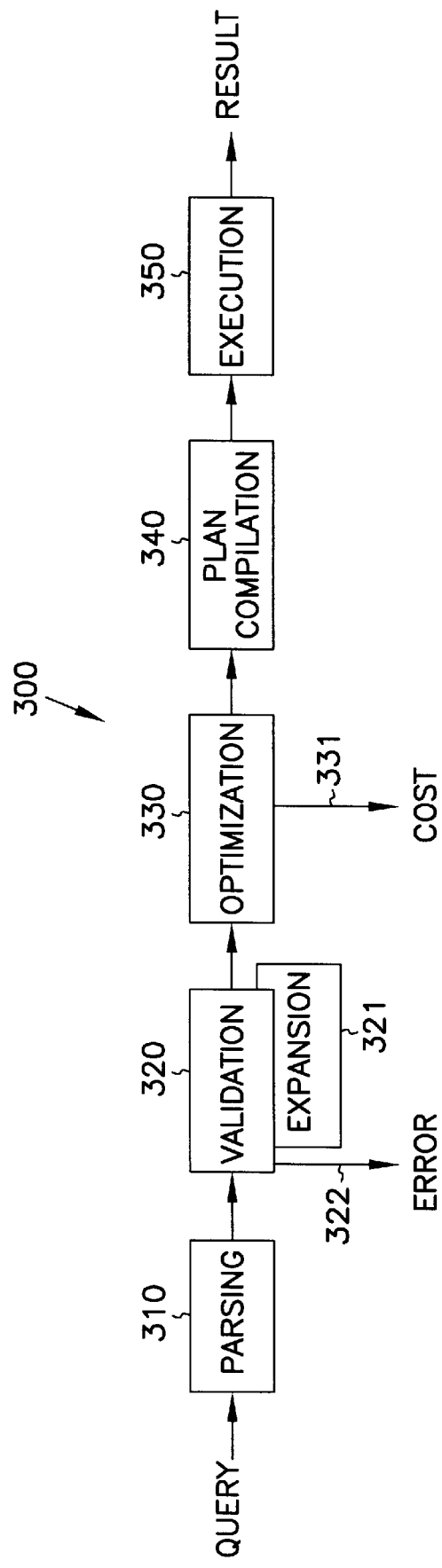
FIG. 3 is a flowchart of the functions performed by the DBMS of FIG. 2.

FIG. 3 illustrates some conventional functions 300 of search engine 241, FIG. 2, for processing a query transmitted from any of the client applications 210. SQL is a nonprocedural language because an SQL query is a specification of properties or predicates of a desired result, rather than a sequence of steps for obtaining the result. That is, a query such as SELECT year, quarter, sales FROM Narrow WHERE sales<(SELECT AVG(sales) FROM Narrow) ORDER BY year, quarter specifies the properties of an output table. The columns of the output table correspond to the columns named year, quarter, and sales taken from an input table named Narrow. The output-table rows (records) are to be ordered (i.e., sorted) by year and then by quarter within each year value. The records from the input table which appear in the output are only those where the value of sales is less than the average value of all values of sales in the table named Narrow. The nested subquery SELECT AVG (sales) FROM Narrow generates a table having only a single column and a single row containing the average value of sales in the Narrow table. The manner and sequence in which the records of the input table are accessed, and other details of the procedure or plan for building the output table are not defined by the query itself.

When search engine 241 receives a query, it parses the query into an internal or tokenized form, as shown in step 310. Validation step 320 ensures that the data named in the query actually exists in the database, and checks data and integrity constraints. It may expand some parts of the query, such as macros and views, at 321. Output 322 reports airy errors back to the user or other source of the query. All but the most limited search engines perform extensive optimization upon the query, as indicated in step 330. Optimization may involve rewriting the query by combining or splitting portions of the query, rearranging operations and subqueries, etc., and other methods, such as sequencing accesses to the records of stored database tables, and modifying functions For each candidate execution strategy, they calculate a cost value representing the computing time or resources required to execute the query using this strategy, and then select one strategy among all the possible candidates. Although the art of designing these optimizers is complex and arcane, those adept in it have the ability to adapt conventional optimizers so as to include new query functions of various types; designers of translators for other, more procedural languages also routinely construct optimizers of this same general class. A survey paper, M. Jarke and J. Koch, "Query Optimization in Database Systems," *ACM Computing Surveys* 16, 2 (June 1984), p. 111, discusses the construction of database query optimizers in more detail.

The output of step 330 is a query evaluation plan (or simply "plan") for answering the query. Step 340 compiles this plan into a procedural form, usually represented as a conventional function tree. Step 350 may then run a simple tree-traversal algorithm for executing the plan against the database objects. The output of step 350 is the result of the query, in the form of an output table returned to the source of the query. Search engines other than the one described herein may combine or divide the individual steps 300, or may omit or add steps. Another survey paper, G. Graefe, "Query Evaluation Techniques for Large Databases," *ACM Computing Surveys* 25, 2 (June 1993), p. 73, hereby incorporated by reference, addresses the subject of query execution, and cites a number of references providing additional description and discussion. Again, the steps of the newest search engines are specifically designed for easy extensibility to accommodate new syntax, new query function, optimization knowledge, and execution technology.

Pivot and Unpivot Operations

Figure 4:
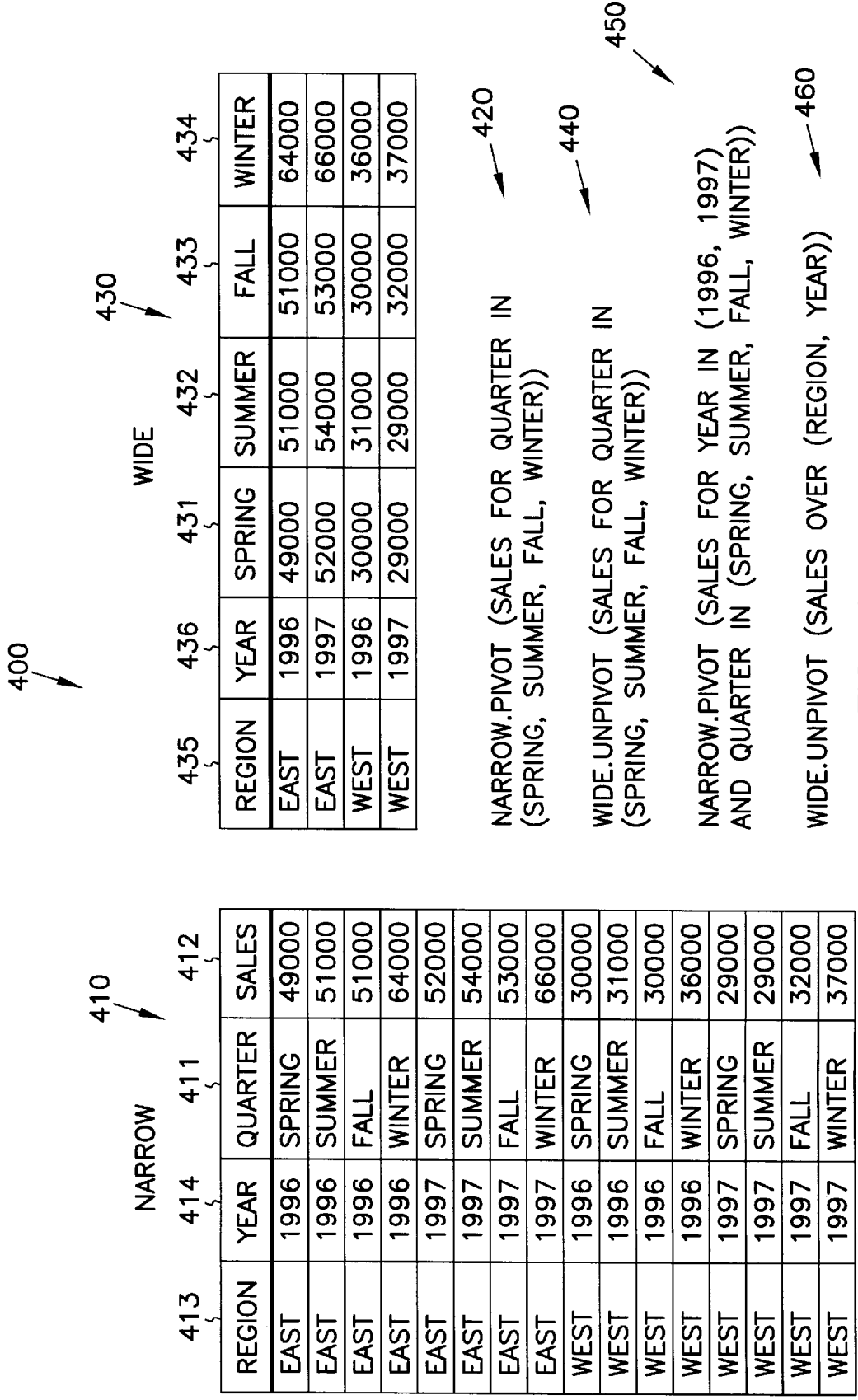
FIG. 4 illustrates examples of pivot and unpivot operations according to the invention.

FIG. 4 shows the structure of a pivot operation according to the invention. This operation fits into the hierarchy of SQL operations at the level of relational algebra. Those who design relational database systems and interfaces divide query processing into three levels. Because the mathematical theory of relations provides the conceptual framework for this type of databases, the first and second levels are frequently called the relational calculus and the relational algebra.

The relational calculus, like any calculus, deals with a high-level description or specification of a desired result, without naming any operations, procedures, or other method for obtaining the result. That is, it merely expresses the definition of a desired result relation (table) in terms of existing relations in a database. The query SELECT employee.name, department.name FROM employee, department WHERE employee.dept_id=department.dept_id, for example, describes the properties and constraints of an output table in terms of one or more input tables in terms of a typical member of the result relation and a qualification representing the defining property of the result members. The relational calculus provides the foundation for a formal, exact understanding of databases, tables ("relations"), and queries, and has found a commercial realization in the query components of the database language SQL, now an ANSI/ISO standard. Given the important role SQL plays in data-management products, extending database functionality for the real world requires that any added functionality should become a syntactically and semantically clean extension of the SQL language.

Relational algebra is more operationally oriented (yet equivalent to) relational calculus. Operations or functions in relational algebra consume one or more input tables and produce an output table according to a rule. For example, the relational operation JOIN [employee.dept_id= department.dept_id] (employee, department) combines the tables named employee and department along a common column or field named dept_id in both tables. (This is analogous to an operation such as addition, which consumes two numbers and produces a third, as, for example, the operation "4+5" produces "9".) Key characteristics of relational algebra are that: (1) operations consume and produce objects of the same type, namely relations; (2) operations can be nested into arbitrarily complex structures; and (3) new operations can be added. In the relational algebra, input objects not only have inputs, but may also carry tags denoting additional information. In the example immediately above, the join operation not only specifies the two relational-algebra expressions, namely the two tables (employee, department) to be joined, but also names a "join predicate" specifying how they are to be joined: along equal values of a particular column in each table, [employee.dept_id=department.dept_id].

Some very useful query operations are difficult to express at the relational-calculus level, yet they integrate easily and cleanly into the relational-algebra level. For example, OUTER JOIN, a variant of the relational JOIN operation, does not fit easily or cleanly into the simple SELECT . . . FROM . . . WHERE query syntax. Therefore, ANSI/ISO permit a limited set of relational-algebra expressions in place of tables in the from clause, e.g., SELECT employee.name department.name FROM employee LEFT OUTER JOIN department ON employee.dept_id=department.dept_id. That is, there is a precedent for extending a relational-calculus query with a relational-algebra expression, although such extensions have been thus far restricted to variations of JOIN operations. Relational-algebra operations often participate in the optimization of queries having selections, projections, aggregations, and other nonprocedural specifications at the relational-calculus level, as in block 330, FIG. 3.

Query-execution plans constitute the third and lowest level of query processing. Although the nesting of relational-algebra operations may indicate an order of execution, algorithms or sets of particular instructions for producing intermediate results occur at the level of execution plans, rather than at the higher levels. For example, there are three basic methods for performing relational JOIN operations: nested loops, merge-join, and hash-join; and each method has a large number of variants. Execution plans clearly indicate the choice among such alternatives, and are formulated at the lowest level of query processing in block 340, FIG. 3.

Because relational query processing is defined very precisely and within a definite structural framework, it is important to define any new functionality at all three levels: language extensions, relational-algebra operations, and execution plans. The invention may provide the pivot and unpivot functions as new relational-algebra operations that participate explicitly in SQL queries, as extensions to the language.

The formal definition of a pivot operation, for an input table-expression in first normal form that is a valid query expression, is: Table.PIVOT (<value_column>FOR<pivot_column>IN (<pivot_list>)); the output pivoted table then is also a valid first-normal-form table. The text between the outermost parentheses constitutes the specification of the pivot operation. The first two columns in the pivot specification must be columns in the pivot operation's input table. These columns will not appear in the pivot operation's output table. Instead, each value in the pivot list within the pivot specification defines a new column in the pivot operation's output table. In the input table, elements in the pivot list appear as values in the pivot column. Corresponding values in the value column become values in the new columns in the output table. All columns of the input table not included in the pivot specification, called "grouping columns," are carried over to the output table.

In the example 400 set forth in FIG. 4, pivoting input table 410 in accordance with specification 420 produces output table 430. Pivot column 411, named Quarter in the input table 410 named Narrow, becomes four columns 431, 432, 433, and 434 in the output table 430. The names of these columns are the four distinct values, Spring, Summer, Fall, Winter, that appear as values in column 411, and that also appear in the value list following the keyword IN in 420. The sales numbers in value column 412 appear as values in corresponding ones of the four columns 431–434, but pivoted or rotated, so that sales figures for the same region and year are in the same row. Grouping columns 413–414 appear as columns 435–436 in output 430. In the output, the rows are grouped by equal values of the first grouping column 413, and then by equal values of the second grouping column 414, just as though specification 420 had contained an SQL clause of the form GROUP BY Region, Year. In this example, the effect of the pivot operation is to modify the perspective along which the data is viewed. Input table 410 presents data trends primarily by year for the Narrow regions of a company, whereas output table 430 allows seasonal tracking by quarters. (It should be recalled here that the rows in an relational table do not have names, and have no particular order. Columns do have names and are sorted—that is, they are presented in the order their names appear in a query.) The pivot operation converts an input table having relatively many rows and relatively few columns into a result table having fewer rows and more columns.

The pivoted columns in the output table have the same data type (numeric, varchar, etc.) as the data in the value column of the input table. The value column, pivot column, and pivoted columns comprise simple data, rather than computed expressions. The order of the columns in both tables is not significant, as in ANSI SQL; columns can be referenced only by name, not by position. Although table 430 is shown sorted by values of grouping columns Region and Year, the pivot operation does not imply any particular sorting or ordering of the rows.

As mentioned above, a row in the input table does not appear in the output if its value does not appear in the pivot list. The input-table rows are grouped by equal values of any grouping columns, with respect to the definition of equality. Within each group, each row of the input table has a mutually distinct value in the pivot column. Each group results in one output row. For output columns not having a corresponding input row, the value is NULL, a special value defined in SQL.

Figure 5:
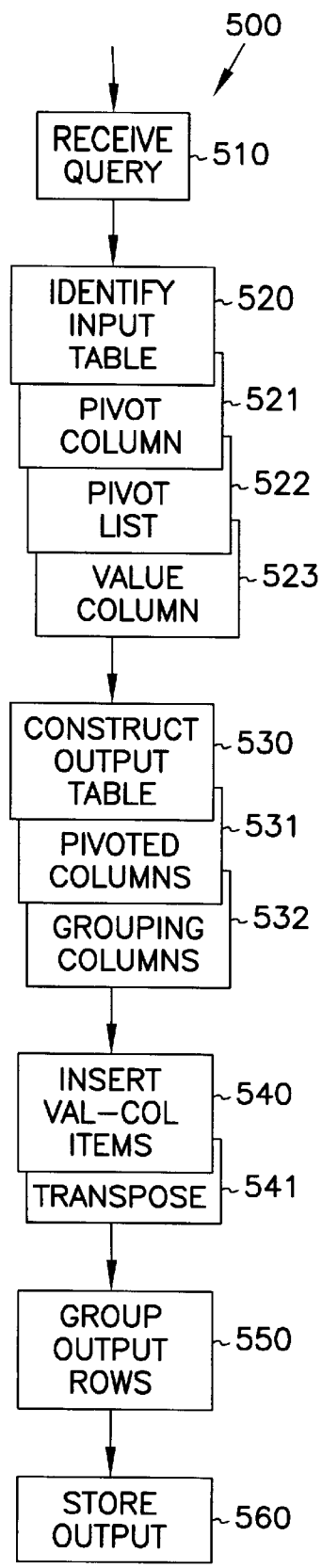
FIG. 5 is a flowchart of a pivot operation according to the invention.

FIG. 5 is a flowchart 500 of the steps carried out by modules 300, FIG. 3, of search engine 241 in FIG. 2 for a pivot operation. Block 510 receives a query from a user at a client terminal 120, FIG. 1, or from some other source as described herein. Step 520 identifies or selects which table 261 in database 260 is to serve as the input table of the operation. Step 521 identifies which column of the input table is to be the pivot column, step 522 identifies from the pivot list which pivot-column values participate in the pivot, and step 523 selects which column of the input is the value column. Step 530 constructs the output as another table 261. Step 531 emplaces a separate pivoted column for each data-item value in the pivot list. Step 532 constructs the grouping columns, if any. (As mentioned previously, these are any additional columns of the input table not identified in the pivot specification.) Step 540 inserts the data-item values of the value column into the rows of the output table as described previously; one method is by transposition, as indicated by step 541. Another way to express this transposition is that each data item in the value column is placed into one of the pivoted columns, namely, that column whose name is the same as the data value in the pivot column of the input table. Step 550 groups the output-table rows by equal values of any grouping columns. Finally, step 560 stores the output table in database 260, FIG. 2.

The unpivot operation is the inverse of the pivot operation, and is formally defined as <table_expression|query-expression>.UNPIVOT (<value_column> FOR <pivot_column> IN (<column_list>). The meanings of the terms are the same as for the pivot operation. Applying a pivot and an unpivot operation having the same specification to an input table restores the input table to its original state. In the example shown in FIG. 4, applying the unpivot operation 440 to pivoted table 430 restores table 410; the two named columns Sales 412 and Quarter 411 replace columns 431–434.

For each row in an input table, the unpivot operation generally produces one row of an output table per pivoted column. (However, a null value in a pivoted column does not generate an output row.) All columns in the pivot list must have the same data type in the input, and the entries in the value column of the output will have this type. Unpivoting a table increases the number of its rows and decreases the number of columns. Again, although FIG. 4 shows table 410 sorted by grouping-column values, the unpivot operation implies no row sorting in the output.

Figure 6:
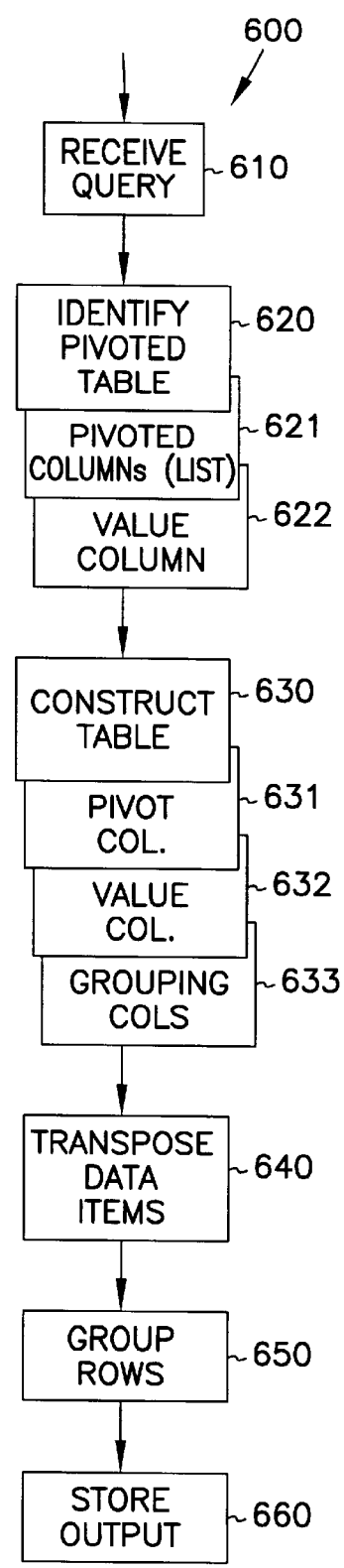
FIG. 6 is a flowchart of an unpivot operation.

FIG. 6 is a flowchart 600 of the steps carried out by modules 300, FIG. 3, of search engine 241, FIG. 2 for an unpivot operation. Step 610 receives the unpivot operation and its specification. Because unpivot is defined to be the inverse of pivot, and to restore a pivoted table exactly to its unpivoted form, the specification of an unpivot is not complementary to that for a pivot, but rather has exactly the same form as that of the specification which created the pivoted table in the first place, as shown at 440 in FIG. 4. Again, step 610 may receive the operation from a user query or any other source. Step 620 identifies or selects the pivoted table such as 261 to be unpivoted. This table need not have been actually pivoted in a previous operation, but it normally will have been; that is, the pivot operation is generally used to achieve any initial rotation of perspectives, and unpivot is generally only used to restore a table to an original unpivoted form in a clean, simple manner. Step 621 uses the specification's pivot list to identify which columns are the pivoted columns to be rotated or transposed. Steps 622 and 623 identify the names of the value column and the pivot column. These names are included in the specification because they do not appear anywhere within the pivoted table (at least, unless a previous pivot had kept a side table retaining this information).

Step 630 constructs the pivot table which is to be produced by the unpivot operation. Steps 631 and 632 form the pivot and value columns in the pivot table, using the names supplied in steps 622 and 623. Step 633 builds grouping columns in the pivot table, one for each of the pivoted-table columns not included in the unpivot specification received in step 610. Step 640 transposes the data items from the pivoted table into the unpivoted table constructed in the preceding steps. Names of the pivoted columns become data items in different rows, and the data items in the pivoted column go into the new value column, in the rows having respectively the same pivot-column values as the name of the pivoted column that they were in, in the original (pivoted) table. Step 650 groups rows by equal values of the grouping-column rows. Step 660 stores the table away in database 260, FIG. 2.

Correlation variables are not permitted within the specification of pivot and unpivot operations, because the pivot, value, and pivoted columns are simple data, and not computed values. These new operations have no bearing upon whether or which correlation variables are permissible in a query expression to which the operations are applied. If ANSI SQL permits defining table and column aliases for a query expression in which a pivot or unpivot operation does not occur, then it is acceptable to define such aliases for the query expression including a pivot/unpivot operation, but not for the query expression excluding the operation. For example, if Table1 AS Table2 (col1, col2) is permissible, then Table1.PIVOT ( . . . ) AS Table2 (col1, col2, . . . ) is acceptable, but Table1 AS Table2 (col1, col2).PIVOT ( . . . ) is not.

The pivot and unpivot operations may employ any number of conventional optimization techniques in block 330, FIG. 3. Because these operations are part of the relational-algebra level, an algebraic query optimizer may be the most appropriate vehicle for realizing optimization techniques. Other optimization frameworks may be applicable as well.

Some additional optimization techniques may employ specific properties of the new operations. Obviously, a neighboring pair of pivot and unpivot operations may cancel each other, and may then be removed from a query. An optimizer should recognize that the grouping columns in the pivoted output table functionally determine the pivot and value columns, and therefore form a relational key of the result table. (This is very similar to the grouping columns in a conventional GROUP BY operation.) In an unpivot output table, the grouping columns together with the pivot column functionally determine the value column. These properties can assist in estimating the number of output rows for selectivity estimation and query-cost calculation for comparing alternative execution plans. They also may find utility in generating conditions for applying rewrite rules in simplifying the execution of a query. If a table is vertically partitioned, an operation to reassemble complete rows and a subsequent unpivot may cancel each other, eliminating both operations.

A conceptual similarity of the pivot operation to an SQL GROUP BY clause allows many techniques and rules for optimizing queries having that clause to serve as well for the new operations. Typical examples include: (1) pulling a pivot above a join, so as to reduce the grouping input's size, or to enable more efficient join algorithms; (2) pushing a pivot below a join to reduce the join input or to employ more efficient execution plans for the pivot; (3) merging two adjacent pivots, possibly effectively eliminating one of them; and (4) splitting a pivot into two parts, then pushing one of the parts through a join or across a process boundary, as a local/global aggregation in a parallel execution environment. In general, a query predicate on the grouping columns and a projection operation—including expressions that compute additional columns—can be moved through (either above or below) a pivot/unpivot operation in the same manner as a grouping operation.

Certain query predicates are more efficient to implement—and also easier to express—when treated as predicates (i.e., qualifications) against a pivot result table. For example, comparing two pivoted columns to each other is straightforward to express and efficient to implement, whereas the same predicate applied to the pivot input table requires complex, inefficient nested queries. Therefore, rewriting the query to include a pivot/select/unpivot sequence of operations can be used to optimize such queries. For example, consider a query to select table rows in which Sales in the Fall exceeds Sales in the Spring in table 410, FIG. 4. Pivoted table 430 can accommodate this query as a comparison between the Spring and Fall columns 431 and 433, whereas the original table 410 requires joining the table to itself in order to perform the comparison. Using the tables of FIG. 4, such a larger query including pivot and unpivot operations (in conventional multiple-line format) might be:

(SELECT * FROM

Narrow.PIVOT (Sales FOR Quarter IN (Spring, Summer, Fall, Winter))

WHERE Fall_Sales>Spring_Sales)

.UNPIVOT (Sales FOR Quarter IN (Spring, Summer, Fall, Winter))

Execution plans useful for block 340, FIG. 3, can be derived by those skilled in the art from conventional plans for grouping operations. In particular, plans based upon looping, indexing, streams, sorting, and hashing come readily to mind. Early-aggregation sorting and hybrid hashing are useful variants. Pivot/unpivot operations are amenable to parallel-execution environments, including parallel algorithms such as shared-memory, distributed-memory, shared-disk, and cluster machines. Local/global aggregation has already been mentioned as a possibility.

Unpivot operations require only a single-input, single-output plan that produces multiple output records for each input record. This operation can be easily executed in parallel on shared-memory, distributed-memory, shared-disk, and cluster machines.

Variations and Extensions

A number of variants and extensions to the above embodiment may be useful for some applications, either alone or in combination with each other. The most obvious, of course, are the replacement or augmentation of notational conventions, such as the dot invocation separator, and the rearrangement of components.

The pivot/unpivot operations as thus far described place limitations upon column names in the pivoted or output table. Column names in standard SQL must be character strings without spaces. Because column values may have spaces, and pivot changes values into names, a method can easily be devised to employ quoted identifiers and literals as column names. Likewise, it would be simple to represent column values having data types other than character strings as printable and readable representations for column names. Conventional name manipulations, such as concatenations of names might be useful. For example, a pivot list might contain column aliases using a keyword such as SQL AS. (In FIG. 4, if the Quarter values were "1" through "4" instead of season names, the specification of 420 might read (Sales FOR Quarter IN (1 AS "Spring", 2 AS "Summer", 3 AS "Fall", 4 AS "Winter"). In addition, AS might be used to rename pivot-result columns in any context, and user-defined functions could be supplied for converting complex column names, or for conforming names to specific limitations of an SQL implementation.

Semantic extensions might include pivoting and unpivoting multiple columns in a single step. For example, operation 450 in FIG. 4 replaces the three columns 411, 412, and 414 with eight columns, instead of the four columns 431–434 of result table 430. That is, the set of pivot columns represent a Cartesian or outer product of all the pivot lists. A convention for naming the pivoted columns might merely involve concatenating the names, such as Sales_1996_ Spring, etc. A multicolumn unpivot operation with the same specification could decode such names back into their original form, so as to provide a true inverse for this extension. A further extension would permit multicolumn pivoting in steps. For example, it might be desired to apply a further pivot to already pivoted table 430 about column 436, to produce the eight columns described above. Rather than unpivoting table 430 and then applying a multicolumn pivot, an extended form allows a list of columns in place of the value column, e.g., Wide.PIVOT ((Spring, Summer, Fall, Winter) FOR Year IN (1996, 1997)). Optimizer 340 and compiler 350 can easily collapse these operations into a single plan for execution.

The pivot operation (but not unpivot) can support conventional SQL aggregation or grouping functions such as MIN, SUM, AVG, and even COUNT, for the value column at step 540. In that case, the limitation to a single row per group can be lifted. Of course, the type of the new column might differ from that of the original. The following example, based upon FIG. 4, illustrates a query using aggregation:

(SELECT Year, Quarter, Sales FROM Narrow)

.PIVOT (SUM(Sales) FOR Quarter IN (Spring, Summer, Fall, Winter) This query consolidates Sales for the East and West regions into a single sum representing the entire company for each Year. In versions where grouping functions are allowed, the implementation could specify the implicit application of a particular function, such as SUM, in all cases where a pivot operation would otherwise produce duplicate primary keys in different rows of the pivoted table. Pivots with grouping cannot be reversed, because the aggregation loses information detail; grouped output in standard SQL cannot be reversed for the same reason. Although this extension prevents unpivot from functioning as a true inverse, an embodiment preserves this capability by adding an internal "side table" that saves all the original values.

Another powerful extension adds a capability for replacing the list of literal column names in a pivot or unpivot operation with a SELECT query. More complex processing would involve running the auxiliary query first, then binding the list of pivoted columns using the result of the auxiliary query; that is, the auxiliary query requires interleaved compilation and execution in blocks 340 and 350, FIG. 3. The execution requires computing the query expression that is to be pivoted, as well as running a query against the result.

The pivot specification might omit the pivot list entirely, supplying a default query instead. For example, omitting the clause IN (Spring, Summer, Fall, Winter) from query 420 could substitute a default query SELECT DISTINCT Quarter FROM Narrow. Because this causes query 420 to reference the input table twice, it would be useful to introduce a dedicated name for an operation's input table, analogously to the name "this" in C++. Operation 420 would then become:

Narrow.PIVOT (Sales FOR SELECT DISTINCT Quarter FROM INPUT).

Instead of requiring a pivot list, the unpivot operation might allow a specification of all but the pivoted columns in the operation's input. In the example 400 as modified above, the inverse operation could be specified as (see 440, FIG. 4:

Wide.UNPIVOT (Sales FOR Quarter IN (Spring, Summer, Fall, Winter)) or as (460, FIG. 4):

Wide.UNPIVOT (Sales OVER (Region, Year)).

Supporting OVER in this context necessitates determining the set of pivoted columns from the input table, and thus requires the ability to process auxiliary queries, as described above. The IN and OVER clauses can be combined, permitting one or more columns to be a pivoted column as well as a grouping column. A situation where this might make sense from the application's perspective is the inclusion of Spring sales in each output row, in order to allow computation of sales growth since the first quarter for each subsequent quarter.

In some tables, a set of columns can be more or less orthogonal or independent; for example, columns named "City" and "Month" are likely to have table entries for all cities for all months. Other column sets are hierarchical—such a "Locations" table having "State", "City", and "Store" columns—and their data is sparse; that is, very few cities will occur in multiple states, and few cities will have multiple stores. In the latter case, the use of two IN clauses leads to ungainly syntax and semantics in a pivot operation. However, employing a list of pivot columns instead of a single pivot column ameliorates this problem. ANSI SQL's concept of "row values" is appropriate to this case. Typically, although not always, it is more convenient to specify a query as the pivot list, rather than a list of literal column names. An exemplary form might be Locations.PIVOT (SalesVolume FOR (City, Store) IN (SELECT City, Store FROM Outlets)).

The pivot and unpivot operations could also find utility in the internal operation of query processors 300, FIG. 3 In addition, referential-integrity constraints need to be enforced only for deleted candidate keys and new foreign keys; using pivot/unpivot or a similar rotation could collapse deletion and insertion items pertaining to the same key value, and thus potentially eliminate some integrity checks as redundant. Moreover, in a conventional query having a very large IN clause, an internal unpivot operation invoked implicitly by the search engine can map a single very complex row containing many literals or parameters as columns into a set of rows that can be matched against database tables, using conventional join methods such as loops, index, merge, and hash join, and their parallel-processing variants. Similar internal invocations of pivot/unpivot operations may be useful in OR and UNION queries, which are often equivalent to IN clauses.

Finally, the pivot and unpivot operations, along with their extensions, optimizations, and execution plans, can be included in database management systems and data-manipulation software outside the field of relational database systems. For example, an algebra-based statistical-analysis product or a standalone sorting package may find these new operations useful, both externally and internally. Although described in connection with the SQL language, the operations need not necessarily be incorporated into SQL, or indeed into any host language.

What is claimed is:

1. A method of unpivoting data in a relational database management system on a digital computer, comprising:

identifying a relational pivoted table having data stored therein and having names associated therewith stored outside the pivoted table;

identifying a pivot-column name for a relational unpivoted table; identifying a pivot list of columns of the pivoted table; identifying a value-column name for the unpivoted table;

constructing a pivot column and a value column in the unpivoted table; and transposing the pivoted table about the columns in the pivot list so as to place the names of the pivot-list columns from outside the input table as data items stored within the unpivoted table in the pivot column, and to place data items in the pivot-list columns into rows of the value column of the unpivoted table.

2. A method according to claim 1, comprising the further steps of:

identifying at least one grouping column of the pivoted table; and grouping the rows of the unpivoted table according to equal values of the data items in the one or more grouping columns.

3. A method according to claim 1, wherein the transposing step occurs at a central server responding to users located multiple remote client locations, and wherein the identifying steps originate with one of the users.

4. A method according to claim 1, wherein the identifying steps originate in a search engine at the central server as a part of optimizing a query from a user which query does not include the pivot method as an explicit operation.

5. A method of transforming data from a pivoted relational database table stored in an electronic data processor into an unpivoted relational table, both of the tables having an array of data values stored in cells of the table and organized as a plurality of rows and columns and having multiple column names associated with respective ones of the columns but not a part of the tables themselves, the method comprising:

selecting a name as the name of a pivot column;

selecting a plurality of names of the columns in the pivoted table as a pivot list;

selecting a name as the name of a value column;

accessing the pivoted table in the data processor;

creating a pivot column in the unpivoted table, having a name stored outside the unpivoted column itself and selected as the pivot column name;

converting the column names in the pivot list into data values stored within the unpivoted table in the pivot column;

creating a value column in the unpivoted table having the name selected for the value column;

for each particular data value in each particular column of the pivoted-table columns in the pivot list, placing the particular data value into the value column of the unpivoted table in a row which also contains a data value in the pivot column corresponding to the particular column of the pivoted table; and storing the unpivoted table in the data processor.

6. A method according to claim 5, wherein the pivoted table includes columns other than the columns in the pivot list, the method comprising the further step of grouping the rows of the unpivoted table by equal values of the data items in at least some of the other columns.

7. A method according to claim 6, wherein the grouping step groups the rows of the unpivoted table by equal values of the data items in all of the other columns.

8. A relational database system, comprising:

a number of clients; and a search engine including modules for parsing, optimizing, and executing a query from one of the clients containing a pivoting operation specifying a relational input table in a relational database, a name of a pivot column from outside the input table itself, and of a value column in the input table, and a pivot list of data values in the pivot column, the search engine transposing data items in the value column of the input table about the pivot column based upon the data items in the pivot list so as to construct a pivoted relational output table having the data items in the pivot list as column names outside the table itself, wherein the query from the one client includes an unpivot operation specifying an unpivoted table for inverting the effect of the pivot operation upon the pivoted table by transposing data items in the pivoted table about a number of pivoted columns.

9. A system according to claim 8, wherein the data items in the pivoted column are placed into the value column of the unpivoted table.

10. A relational database system, comprising:

a number of clients; and a search engine including modules within itself for parsing, optimizing, and executing a query from one of the clients containing a pivoting operation specifying a relational input table in a relational database, a name of a pivot column from outside the input table itself, and of a value column in the input table, and a pivot list of data values in the pivot column, the search engine transposing data items in the value column of the input table about the pivot column based upon the data items in the pivot list so as to construct a pivoted relational output table having the data items in the pivot list as column names outside the table itself, without exporting the data items or the pivot list.

11. A system according to claim 10, wherein the search engine reside in a central server, and the clients are physical located at multiple locations remote from the server.

12. A system according to claim 10, wherein the optimizer module optimizes the query including the pivot operation.

13. A storage medium for use in a suitably programmed digital computer, the medium containing computer-readable representations of an unpivoted relational table in a relational database, the unpivoted table having data values placed in rows and columns according to a pivot specification involving a pivoted relational input table, a pivot column, a pivot list, and a value column, the unpivoted table comprising:

a pivot column having a name corresponding to the pivot column, and whose rows contain data items stored within the pivoted input table itself and derived from the names of pivoted-table columns appearing in the pivot list, which names are separate from the pivoted table itself; and a value column having a name derived from the name of a value column in the specification, each particular row of the value column containing a data item derived from the data item in that one of the pivoted columns whose name is a data item in the same particular row of the unpivoted table.

14. A table according to claim 13, wherein the pivoted table contains at least one further column in addition to the pivoted columns.

15. A table according to claim 14, wherein the rows of the unpivoted table are grouped by equal values of the at least one further column.

16. A table according to claim 13, wherein the table is stored on a storage medium.

17. A data-storage medium having a program stored thereon for causing a suitably programmed computer to perform the steps comprising:

identifying a relational pivoted table, a pivot list of column names from outside the pivoted table, and a pivot-column name and a value-column name for an unpivoted table;

constructing a pivot column and a value column in a relational unpivoted table; and transposing the pivoted table about the columns in the pivot list to place the names of the pivot-list columns as data items stored within the pivot column of the unpivoted table, and to place data items in the pivot-list columns into rows of the value column of the unpivoted table.

18. A data-storage medium according to claim 17, wherein said programmed computer performs the further steps of:

identifying at least one grouping column of the pivoted table; and grouping the rows of the unpivoted table according to equal values of the data items in the one or more grouping columns.

* * * * *

UNITED STATES PATENT AND TRADEMARK OFFICE
CERTIFICATE OF CORRECTION

PATENT NO. : 6,298,342 B1
DATED : October 2, 2001
INVENTOR(S) : Goetz Graefe et al.

It is certified that error appears in the above-identified patent and that said Letters Patent is hereby corrected as shown below:

Title page,
Item [56], References Cited, U.S. PATENT DOCUMENTS, insert the following:
-- 5,713,020    1/1998      Reiter et al.    707    102
   5,822,747    10/1998     Graefe et al.    707    2
   5,767,854    6/1998      Anwar            345    355 --

OTHER PUBLICATIONS,
-- Greafe, G., "The New Database Imperatives," *IEEE*, 1998, 69-72
   Graefe, G., "Relational Division: Four Algorithms and Their Perfomance," *IEEE*, 1989, 94-101 --

Column 4,
Line 31, delete "Datanase" and insert -- Database -- therefor;

Column 5,
Line 3, delete "computes" and insert -- computer -- therefor;

Column 6,
Line 13, insert -- . -- after "functions";

Column 9,
Line 30, delete "-expression>.UNPIVOT" and insert -- _expression>.UNPIVOT -- therefor.

Signed and Sealed this

Twenty-fourth Day of December, 2002

JAMES E. ROGAN
*Director of the United States Patent and Trademark Office*